United States Patent
De et al.

(10) Patent No.: US 9,098,378 B2
(45) Date of Patent: Aug. 4, 2015

(54) COMPUTING REUSABLE IMAGE COMPONENTS TO MINIMIZE NETWORK BANDWIDTH USAGE

(75) Inventors: Pradipta De, New Delhi (IN); Manish Gupta, New Delhi (IN); Venkateswara Reddy Madduri, New Delhi (IN); Jai Kumar Singh, New Delhi (IN); Manoj Soni, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 13/362,870

(22) Filed: Jan. 31, 2012

(65) Prior Publication Data

US 2013/0198741 A1      Aug. 1, 2013

(51) Int. Cl.
*G06F 9/455* (2006.01)
*G06F 9/44* (2006.01)
*G06F 9/445* (2006.01)

(52) U.S. Cl.
CPC .............. *G06F 8/71* (2013.01); *G06F 9/45533* (2013.01); *G06F 8/63* (2013.01)

(58) Field of Classification Search
USPC ........................................................... 718/1
See application file for complete search history.

(56) References Cited

U.S. PATENT DOCUMENTS

| | | | |
|---|---|---|---|
| 8,151,062 B2 | 4/2012 | Krishnaprasad et al. | |
| 8,473,587 B1 | 6/2013 | Lappas et al. | |
| 8,578,076 B2 | 11/2013 | van der Linden et al. | |
| 2003/0140107 A1* | 7/2003 | Rezvani et al. | 709/208 |
| 2007/0234302 A1* | 10/2007 | Suzuki et al. | 717/126 |
| 2008/0281884 A1* | 11/2008 | Subrahmanyam | 707/205 |
| 2008/0295064 A1* | 11/2008 | Mitra et al. | 717/100 |
| 2009/0063652 A1 | 3/2009 | Hwang et al. | |
| 2009/0198790 A1 | 8/2009 | Grevers, Jr. | |
| 2009/0282404 A1* | 11/2009 | Khandekar et al. | 718/1 |
| 2009/0300076 A1* | 12/2009 | Friedman et al. | 707/203 |
| 2009/0313438 A1 | 12/2009 | Krishnaprasad et al. | |
| 2009/0319473 A1 | 12/2009 | Rao et al. | |
| 2010/0042720 A1 | 2/2010 | Stienhans et al. | |
| 2010/0223610 A1 | 9/2010 | DeHaan et al. | |
| 2010/0235482 A1* | 9/2010 | Chalupa et al. | 709/222 |
| 2011/0022812 A1 | 1/2011 | van der Linden et al. | |
| 2011/0078681 A1 | 3/2011 | Li et al. | |
| 2011/0145189 A1* | 6/2011 | Zheng et al. | 707/620 |

(Continued)

FOREIGN PATENT DOCUMENTS

GB          2476878          7/2011
WO     WO2012000879 A1     1/2012

OTHER PUBLICATIONS

Yang Chen, Tianyu Wo, Jianxin Li, An Efficient Resource Management System for On-line Virtual Cluster Provision, 2009 IEEE International Conference on Cloud Computing, p. 72-79.*

(Continued)

*Primary Examiner* — Emerson Puente
*Assistant Examiner* — Charlie Sun
(74) *Attorney, Agent, or Firm* — Ference & Associates LLC

(57) ABSTRACT

Methods and arrangements for facilitating virtual appliance image delivery. Virtual appliance image templates are stored at a caching location, based on a historical request pattern. A request is received for a virtual appliance image and there is provided, to a second location, a virtual appliance image responsive to the received request. A difference is determined between the requested virtual appliance image and stored virtual appliance image templates.

13 Claims, 6 Drawing Sheets

(56) References Cited

U.S. PATENT DOCUMENTS

| | | | |
|---|---|---|---|
| 2011/0173405 | A1 | 7/2011 | Grabarnik et al. |
| 2011/0185292 | A1 | 7/2011 | Chawla et al. |
| 2011/0320733 | A1 | 12/2011 | Sanford et al. |
| 2012/0041970 | A1 | 2/2012 | Ghosh et al. |
| 2012/0096457 | A1 | 4/2012 | Gupta et al. |
| 2012/0151476 | A1* | 6/2012 | Vincent .............................. 718/1 |
| 2012/0198451 | A1 | 8/2012 | Gupta et al. |
| 2012/0240110 | A1 | 9/2012 | Breitgand et al. |
| 2013/0097680 | A1 | 4/2013 | Bendapudi et al. |
| 2013/0110961 | A1 | 5/2013 | Jadhav |
| 2013/0117240 | A1 | 5/2013 | Taylor et al. |
| 2013/0132954 | A1 | 5/2013 | Bolte et al. |
| 2013/0198743 | A1* | 8/2013 | Kruglick ........................... 718/1 |

OTHER PUBLICATIONS

Paul Ruth, Phil McGachey, Dongyan Xu, VioCluster: Virtualization for Dynamic Computational Domains, 2005, IEEE.*

Andrew S. Tanenbaum, Modern Operating System, 3rd Edition, Pearson Prentice Hall, 2008.*

Shi, Lei et al., "Iceberg: An Image Streamer for Space and Time Efficient Provisioning of Virtual Machines," International Conference on Parallel Processing—Workshops, 2008, ICPP-W'08, International Conference, Sep. 2008, pp. 31-38, IEEE Computer Society, Washington, DC, USA.

Epstein, Amir et al., "Virtual Appliance Content Distribution for a Global Infrastructure Cloud Service," IEEE INFOCOM 2010 Proceedings, Technical Program, Mar. 15-19, 2010, 9 pages, IEEE Digital Library.

Chen, Yang et al., An Efficient Resource Management System for On-line Virtual Cluster Provision, IEEE International Conference on Cloud Computing 2009, Bangalore, India, Sep. 21-25, 2009, pp. 72-79, IEEE Digital Library.

Borst, Sem et al., "Distributed Caching Algorithms for Content Distribution Networks," IEEE INFOCOMM 2010 Proceedings, Mar. 15-19, 2010, 9 pages, IEEE Digital Library.

Chen, Zhijia et al., "Rapid Provisioning of Cloud Infrastructure Leveraging Peer-to-Peer Networks," 2009 29th IEEE International Conference on Distributed Computing Systems Workshops, Montreal, Quebec, Canada, Jun. 22-26, 2009, pp. 324-329, IEEE Digital Library.

"Method and System for Faster Deployment of Virtual Machine (VM) Images," Disclosure No. IPCOM000199689D dated Sep. 14, 2010.

"Method and System for Fast Virtual Image Provisioning in Cloud Environment," Disclosure No. IPCOM00021398D dated Sep. 2, 2011.

U.S. Appl. No. 61/514,253, filed Aug. 2, 2011, Jadhav, Ajay.

Emeneker, et al, "Efficient Virtual Machine Caching in Dynamic Virtual Clusters," SRMPDS Workshop, ICAPDS 2007 Conference, CiteSeer Digital Library.

* cited by examiner

COMPUTING REUSABLE IMAGE COMPONENTS TO MINIMIZE NETWORK BANDWIDTH USAGE

BACKGROUND

There has been a significant increase of late in consumer demand for the use of virtual machines (VM's) or virtual appliances (VA's) (both of which terms are used interchangeably herein) stored in a cloud network. Requests can typically be made for a VA from a cloud delivery location (e.g., a location at which requests from individual users can be received and serviced), and the VA is accordingly delivered from a corresponding development location. Advantages of such an arrangement are clear in accordance with advantages of a cloud network in general, in that significant storage space at the individual user nodes (e.g., computers) is not needed for hosting or storing a program or other appliance corresponding to a VA that can be requested or ordered from the cloud.

For its part, however, the provisioning of a VA from the cloud takes up its own associated degree of time and resources, whereby apparent advantages of "on demand" or "pay as you go" facilities can practically be lost. Particularly, significant time can be taken in preparing a VM image with an associated software stack, transferring the image to a host capable of providing hardware resources required by the VM, booting VM, and configuring and starting the associated software components.

It can be recognized that since the number of image templates grows exponentially with time, it is not feasible to store all VM templates on each node that might demand or make use of them. Thus, VM or VA template images can be cached close to a cloud delivery location to assist in rapidly servicing a user request for provisioning a VA. This fully recognizes that network-related costs of transferring an image from cache to a delivery location, and thence to an actual node where the image will run, will be negligible in comparison with those involved in transferring from a (cloud-based) VA development location to the cloud delivery location.

It is conceivable to use overlays or snapshots of VM images, but this still entails keeping all the image templates at each of the nodes or at a caching location. Bounded local storage certainly can apply constraints to such an effort while, in any event, if a raw image is not used there is the added implication of using a software layer on top of a given image format, thereby introducing additional delays and possible errors.

BRIEF SUMMARY

In summary, one aspect of the invention provides a method comprising: storing virtual appliance image templates at a caching location, based on a historical request pattern; receiving a request for a virtual appliance image; providing, to a second location, a virtual appliance image responsive to the received request; and determining a difference between the requested virtual appliance image and stored virtual appliance image templates.

Another aspect of the invention provides an apparatus comprising: at least one processor; and a computer readable storage medium having computer readable program code embodied therewith and executable by the at least one processor, the computer readable program code comprising: computer readable program code configured to store virtual appliance image templates at a caching location, based on a historical request pattern; computer readable program code configured to receive a request for a virtual appliance image; computer readable program code configured to provide, to a second location, a virtual appliance image responsive to the received request; and computer readable program code configured to determine a difference between the requested virtual appliance image and stored virtual appliance image templates.

An additional aspect of the invention provides a computer program product comprising: a computer readable storage medium having computer readable program code embodied therewith, the computer readable program code comprising: computer readable program code configured to store virtual appliance image templates at a caching location, based on a historical request pattern; computer readable program code configured to receive a request for a virtual appliance image; computer readable program code configured to provide, to a second location, a virtual appliance image responsive to the received request; and computer readable program code configured to determine a difference between the requested virtual appliance image and stored virtual appliance image templates.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
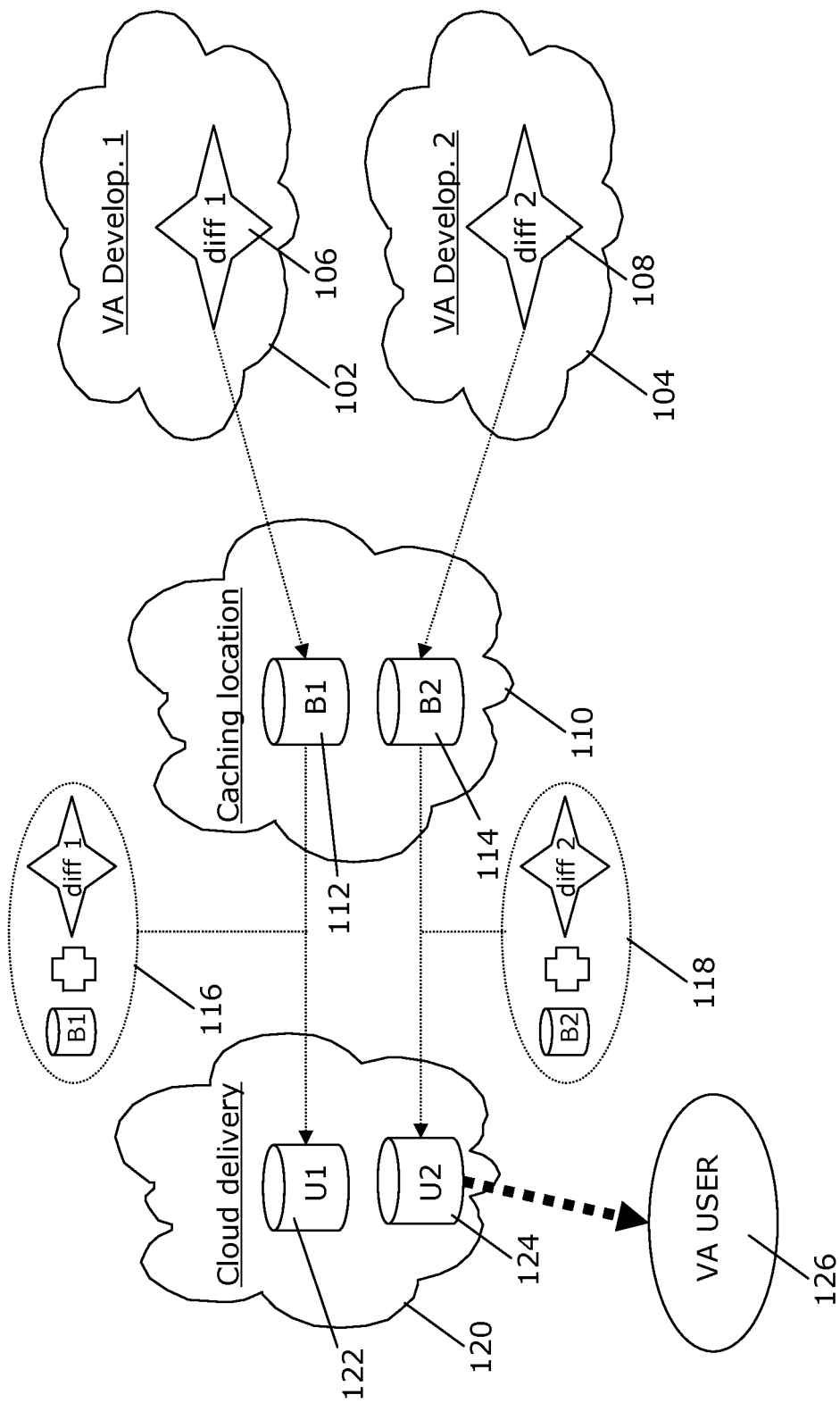
FIG. 1 schematically illustrates an arrangement for managed delivery of virtual appliances using a cache.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
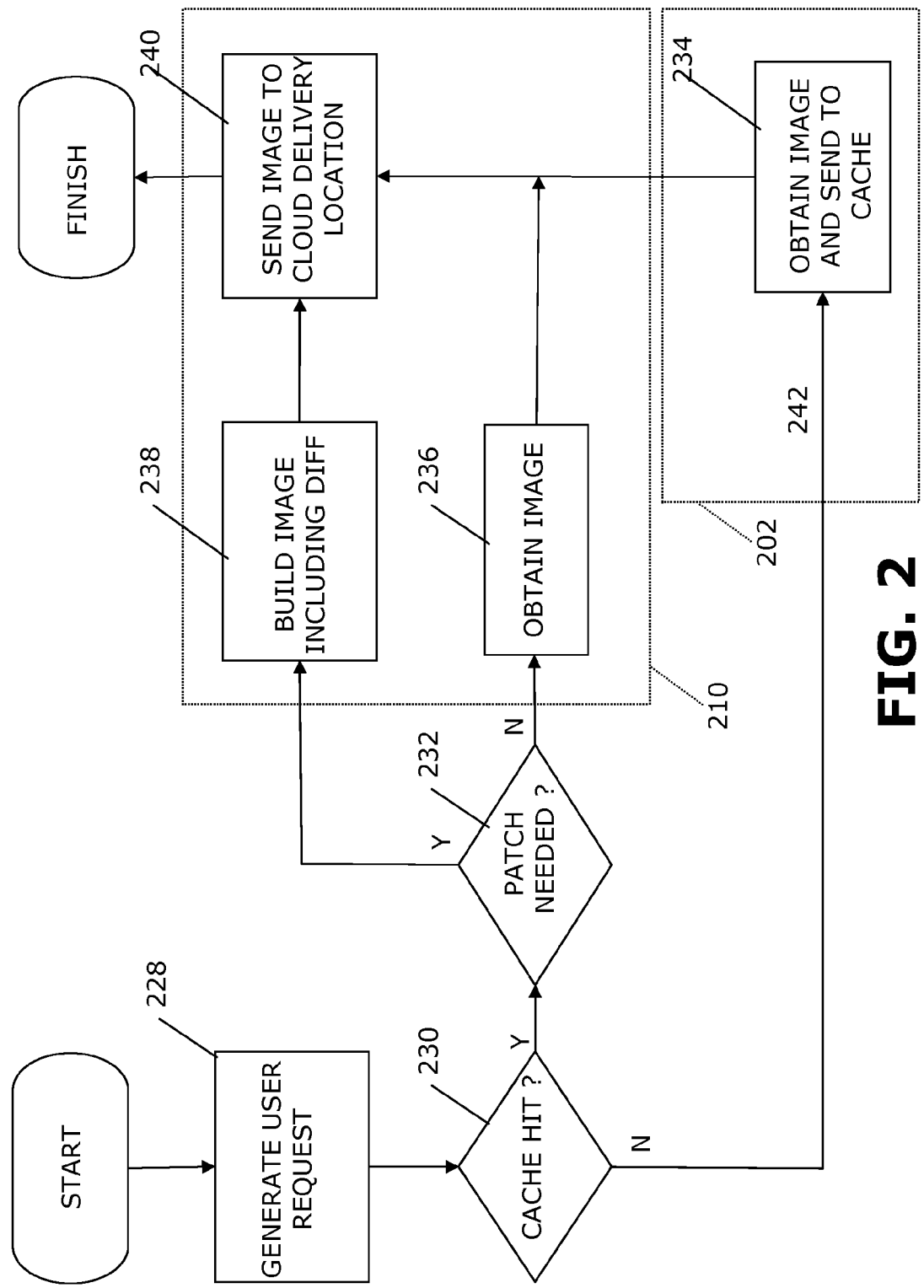
FIG. 2 depicts a process for delivering a virtual appliance image.

The disclosure now turns to FIGS. 1 and 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

To facilitate easier reference, in advancing from FIG. 1 to and through FIG. 2, a reference numeral is advanced by a multiple of 100 in indicating a substantially similar or analogous component or element with respect to at least one component or element found in FIG. 1.

There are broadly contemplated herein, in accordance with at least one embodiment of the invention, methods and arrangements for providing intelligent caching of base VM template images, along with patches to generate other templates, and then building the same efficiently at runtime by way of reducing overall provisioning time, while also efficiently storing those combinations of software stacks that may be demanded by a user. Problems of "image sprawl" can thereby be avoided.

In accordance with at least one embodiment of the invention, an approach is broadly contemplated herein wherein a basic set of images is determined for caching in a caching location, such that traffic flow between a VA development location and cloud delivery location is minimized. A balance can thereby be stricken between caching a number of images (and possibly patches) and in a manner as deemed appropriate, and preventing the cache itself from becoming overburdened or overloaded. If patches are cached, they can help in generating requested templates that may not be available in cache at the time of a request, provided the template to be patched has also been cached.

In accordance with a refinement according to at least one embodiment of the invention, it can be recognized that the mere use of copy-on-write snapshots may introduce performance overhead for some workloads. An approach contemplated herein, by contrast, employs not only caching just a basic (i.e., restricted) set of images but, in a manner to be more fully appreciated herebelow, to do so using relatively small cross-image "diffs" to create a desired or required template; such diffs can be calculated using a suitable function.

FIG. 1 schematically illustrates an arrangement for managed delivery of virtual appliances using a cache, in accordance with at least one embodiment of the invention. Indicated at 102 and 104 are two VA development sites, each capable of producing not only full VA images but also diffs (106 and 108, respectively) that can represent variations on basic VA images. In other words, diffs 106 and 108 can each be produced with respect to at least one base image template in order to supplement a base image template to form a final or composite template responsive to a request.

In accordance with at least one embodiment of the invention, whether on a predetermined (e.g., period) basis or in response to a specific request, diffs 106 and 108 are sent to an image caching location 110 itself containing base image templates (as shown here) 112 and 114. (As will be understood more readily further below, it is also possible to store diffs on a longer-term basis at caching location 110, rather than just merely supply them to caching location 110 in immediate response to a user request.) Then, at times, and as needed (e.g., in response to a user request), different combinations (116 and 118) of base images and diffs are sent to a cloud delivery location 120 in the form of specific user request image templates 122 and 124. At least one such template (e.g., 124) can then be delivered to a virtual appliance user 126. It will be appreciated herein that transmission rates from a development location (102/104) to caching location 110 can be particularly slow (e.g., 1 Mbps) while those from caching location 110 to cloud delivery location 120 can be much faster (e.g., 100 Mbps). Accordingly, embodiments of the invention involve taking advantage of the faster transmission rate from caching location 110 (as opposed to from development locations 102/104), wherein commonly used base images 112 and 114 can be stored at caching location 110 and be readily available in response to a request from user 126, while variations or diffs 106 and 108, which may need to be supplied on an ad-hoc basis, are transmitted from development locations 102/104 and are of a sufficiently small size as to render the slower transmission rate less intrusive.

FIG. 2 depicts a process for delivering a virtual appliance image, in accordance with at least one embodiment of the invention. A user request is generated (228) and then received, e.g., at a cloud manager. It may be the case that an image, or components thereof, desired by a user are not present in cache 210. Accordingly, if a request does not involve a cache hit (230), the request goes to a VA development location 202, wherein the image is obtained (234) and sent to cache 210. If, on the other hand, a request does involve a cache hit (230), it is then determined whether a patch is needed (232), e.g., a supplement to a base image such as a diff component. If so, the user request image is built including any needed diff (238). If not, such as in those cases where a given base image (e.g., as indicated at 112 or 114 in FIG. 1) is already suitable to fulfill a user request, then the base image only is obtained (236). Once an image is sent to cache (234), obtained (236) or built (238), the image, corresponding to a user request, is sent to a cloud delivery location (240).

The disclosure now turns to a discussion of an optimization algorithm for determining those base images and/or diffs/patches to be stored in a caching location. In accordance with at least one embodiment of the invention, it can be assumed that the total capacity of a caching location is C, while $disk_i$ is defined to be the disk size of the image type I. If it is assumed that overall there are N images that users can ask for, then $size(d_{ij}) :=$ size of the diff $d_{ij}$ (wherein $size(d_{ii}):=0$). Further, $f_j$ can be defined to be the frequency of requests for image j, while $u_{ij}$ is 1 if image j is to be created using diff $d_{ij}$; otherwise, $u_{ij}=0$. Here, if $u_{ij}$ is 1 for some j then image i is chosen as a common image component and $u_{ii}=1$ as well In accordance with at least one embodiment of the invention, is 1 if $d_{ij}$ is cached at the caching location o.w. 0. (If $e_{ij}$ is 1 for some j then $u_{ij}$ is 1.) The cost function to be minimized is then defined as:

$$\text{Total traffic flow} := \sum_i \sum_j f_j \text{size}(d_{ij})(u_{ij} - e_{ij})$$

The constraints are:

$$\sum_i u_{ii} disk_i + \sum_i \sum_j e_{ij} \text{size}(d_{ij}) \leq C, \forall i \sum_i \sum_j u_{ij} = N,$$

$$e_{ij} \leq u_{ij}, u_{ij} \leq u_{ii} \forall j \forall i, e_{ii} = u_{ii}, \text{size}(d_{ii}) = 0 \forall i$$

$$\sum_i u_{ij} = 1, \forall j$$

In accordance with at least one embodiment of the invention, for each image j, choose that i for which $\underline{d_{ij}}$ is the minimum. This implies that the optimization problem set forth hereabove yields a cost which will be lower-bounded by $$\sum_j f_j \underline{d_{ij}}.$$

Similarly, it will be upper-bounded by $$\sum_j f_j d_{ij}^*,$$

where $d^*_{ij}$ is the maximum value of dij for a given image j.

In accordance with at least one embodiment of the invention, a greedy heuristic formula is then applied. First, the vertices {i} are ordered in increasing order of weighted sum $$\sum_j f_j \text{size}(d_{ij})$$

of the out-going edges; it can be noted that $size(d_{ii}):=0$. Essentially, an objective is to minimize overall network traffic flow between the development location and the caching location. Thence, filling of a cache of capacity C1 starts in the aforementioned order until either all images are in cache or an image is not able to be accommodated. in the above order until we either have all the images in the cache or an image can't be accommodated.

Thence in accordance with at least one embodiment of the invention, for each image j find the i∈C1 for which $d_{ij}$ is the smallest and assign i as the image to be used for creating j. For the chosen image combinations {(i, j)} in the above step order them in the decreasing order of $$\sum_j f_j \text{size}(d_{ij}).$$

Start placing dij's in the above order into a cache of capacity C2 until either all of them are placed or one of the dij is cannot be fitted into the cache. Compute the cost of the above defined in terms of the dij's that have to be transferred from the development location to the caching location. Repeat the above process for a different C1, C2 cache combination, albeit a fixed number of times, choosing a cache combination whose cost is the minimum among all the trials.

In view of the foregoing, it can be appreciated that, in accordance with at least one embodiment of the invention, while pre-provisioning or caching may incur heavy network bandwidth due to pre-fetching of complete image, network usage is minimized while pre-provisioning. As such, broadly contemplated herein is a federated architecture wherein there is cached only minimal content needed for reconstructing a requested VA. Accordingly, a suitable base image is cached based on a historical pattern of user requests.

Generally, it should be appreciated from the foregoing that, in accordance with at least one embodiment of the invention, both templates and diffs (or "patches") are stored in cache. If an image template cannot be catered either from a base image template in cache, or by patching, then a development site is consulted in order to service a request.

Figure 3:
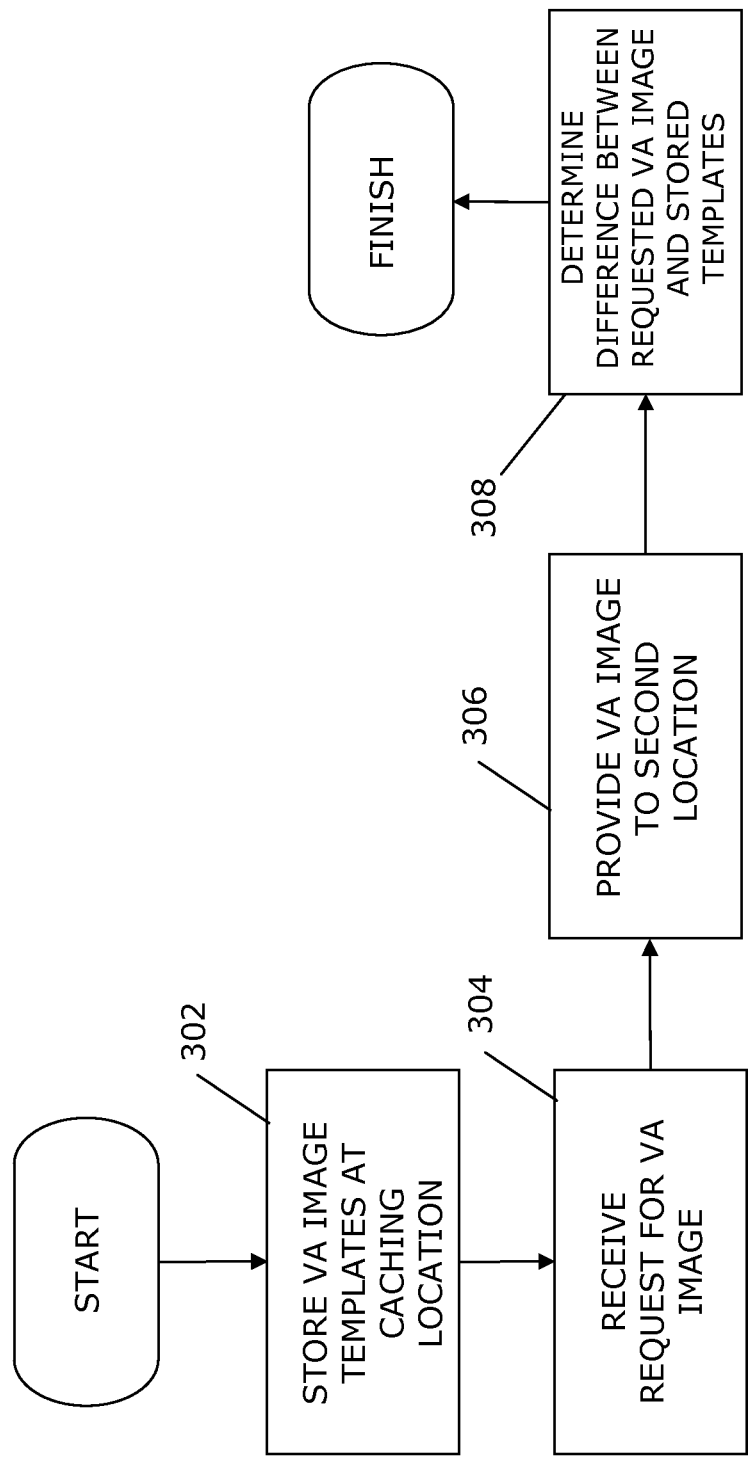
FIG. 3 sets forth a process more generally for facilitating virtual appliance image delivery.

FIG. 3 sets forth a process more generally for facilitating virtual appliance image delivery, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12' in FIG. 4. In accordance with an example embodiment, most if not all of the process steps discussed with respect to FIG. 3 can be performed by way a processing unit or units and system memory such as those indicated, respectively, at 16' and 28' in FIG. 4.

As shown in FIG. 3, virtual appliance image templates are stored at a caching location, based on a historical request pattern (302). A request is received for a virtual appliance image (304) and there is provided, to a second location, a virtual appliance image responsive to the received request (306). A difference is determined between the requested virtual appliance image and stored virtual appliance image templates (308).

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
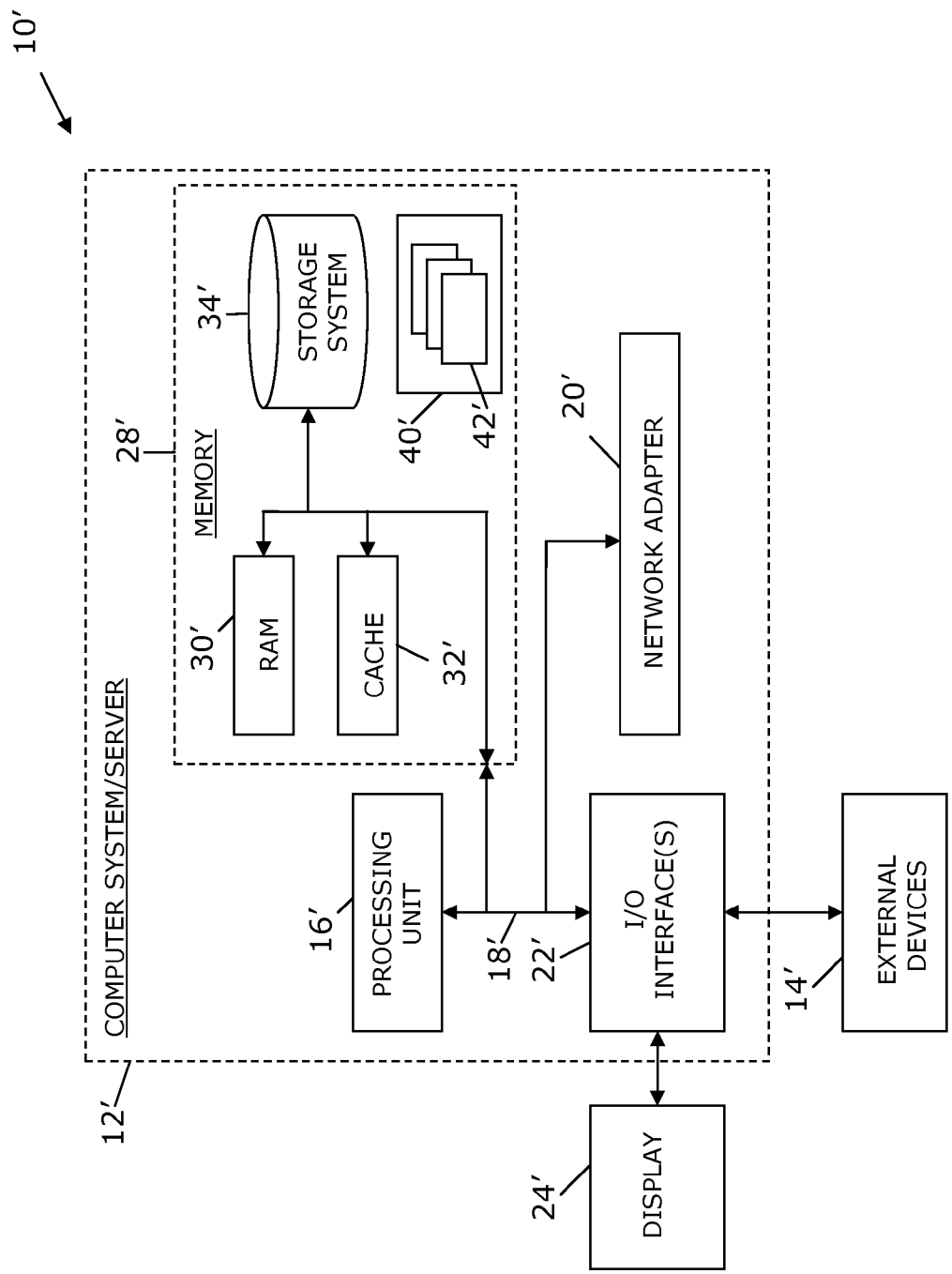
FIG. 4 illustrates a computer system.

Referring now to FIG. 4 a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove.

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4 computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

Figure 5:
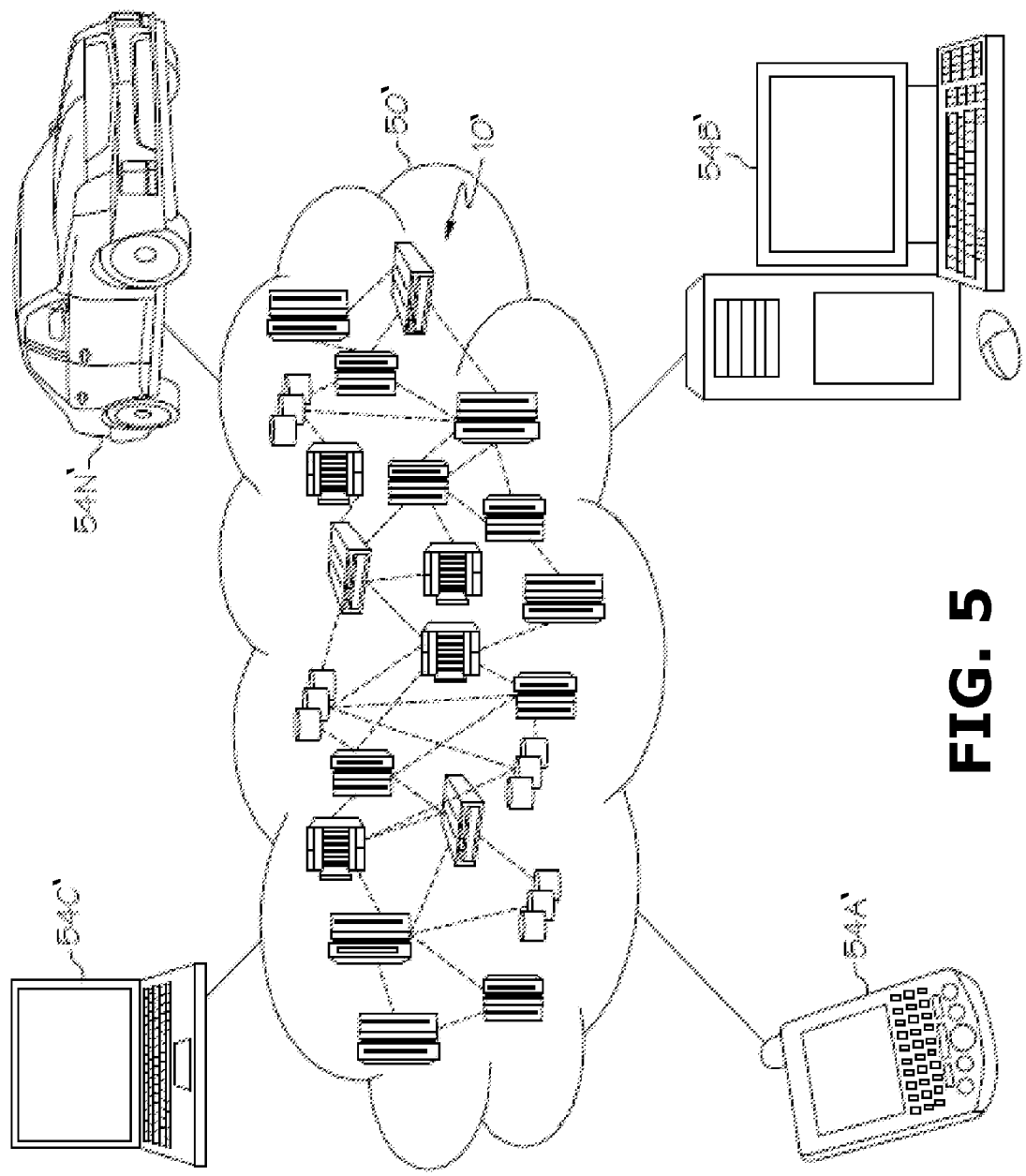
FIG. 5 depicts a cloud computing environment.

Referring now to FIG. 5, illustrative cloud computing environment 50' is depicted. As shown, cloud computing environment 50' comprises one or more cloud computing nodes 10' with which local computing devices used by cloud consumers, such as, for example, personal digital assistant (PDA) or cellular telephone 54A', desktop computer 54B', laptop computer 54C', and/or automobile computer system 54N' may communicate. Nodes 10' may communicate with one another. They may be grouped (not shown) physically or virtually, in one or more networks, such as Private, Community, Public, or Hybrid clouds as described hereinabove, or a combination thereof. This allows cloud computing environment 50' to offer infrastructure, platforms and/or software as services for which a cloud consumer does not need to maintain resources on a local computing device. It is understood that the types of computing devices 54A'-N' shown in FIG. 2 are intended to be illustrative only and that computing nodes 10' and cloud computing environment 50' can communicate with any type of computerized device over any type of network and/or network addressable connection (e.g., using a web browser).

Figure 6:
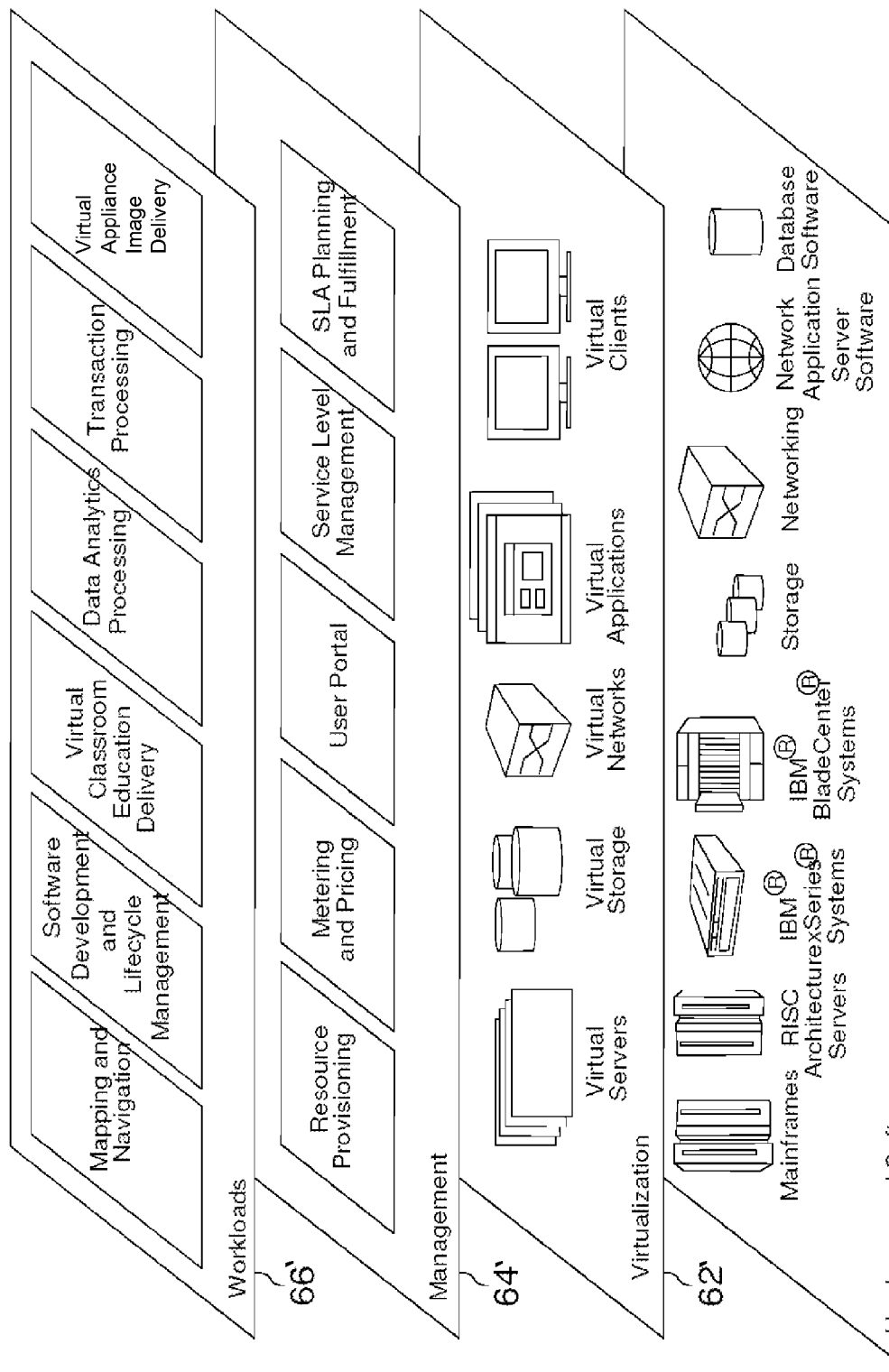
FIG. 6 depicts abstraction model layers.

Referring now to FIG. 6, a set of functional abstraction layers provided by cloud computing environment 50' (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60' includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCentcer® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62' provides an abstraction layer from which the following examples of virtual entities may be provided: virtual servers; virtual storage; virtual networks, including virtual private networks; virtual applications and operating systems; and virtual clients.

In one example, management layer 64' may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66' provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual appliance image delivery (e.g., as broadly contemplated herein in accordance with at least one embodiment of the invention).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a computer readable storage medium having computer readable program code embodied therewith and executable by the at least one processor, the computer readable program code comprising:
   computer readable program code configured to store virtual appliance image templates at a caching location, based on a historical request pattern;
   computer readable program code configured to receive a request for a virtual appliance image; and
   computer readable program code configured to provide, to a second location, a return virtual appliance image responsive to the received request via:
      determining a difference between the requested virtual appliance image and one or more of the stored virtual appliance image templates;
      at the caching location, obtaining a supplement which corresponds to the determined difference between the requested virtual appliance image and the one or more of the stored virtual appliance image templates; and
      delivering the one or more of the stored virtual appliance image templates and the supplement to the second location; and
   computer readable program code configured to apply a cost function for caching at the caching location, wherein the cost function is determined by variables comprising:

a frequency variable indicating a frequency of a request of one or more supplements deriving from a third location;

a size variable indicating a size of the one or more supplements deriving from a third location;

a caching variable indicating whether the one or more supplements are already cached at the caching location; and a supplement variable indicating whether the virtual appliance image is to be created using the one or more supplements;

wherein the cost function comprises at least a product of the frequency variable and the size variable.

2. A computer program product comprising:

a non-transitory computer readable storage medium having computer readable program code embodied therewith, the computer readable program code comprising:

computer readable program code configured to store virtual appliance image templates at a caching location, based on a historical request pattern;

computer readable program code configured to receive a request for a virtual appliance image; and computer readable program code configured to provide, to a second location, a return virtual appliance image responsive to the received request via:

determining a difference between the requested virtual appliance image and one or more of the stored virtual appliance image templates;

at the caching location, obtaining a supplement which corresponds to the determined difference between the requested virtual appliance image and the one or more of the stored virtual appliance image templates; and delivering the one or more of the stored virtual appliance image templates and the supplement to the second location; and computer readable program code configured to apply a cost function for caching at the caching location, wherein the cost function is determined by variables comprising:

a frequency variable indicating a frequency of a request of one or more supplements deriving from a third location;

a size variable indicating a size of the one or more supplements deriving from a third location;

a caching variable indicating whether the one or more supplements are already cached at the caching location; and a supplement variable indicating whether the virtual appliance image is to be created using the one or more supplements;

wherein the cost function comprises at least a product of the frequency variable and the size variable.

3. The computer program product according to claim 2, wherein said computer readable program code is further configured to append the supplement to one of the stored virtual appliance image templates responsive to the determined difference.

4. The computer program product according to claim 3, wherein to provide a return virtual appliance image further comprises obtaining the supplement from the third location responsive to the determined difference.

5. The computer program product according to claim 4, wherein the third location comprises a virtual appliance development location.

6. The computer program product according to claim 3, wherein said computer readable program code is further configured to obtain the supplement from the third location at a predetermined time.

7. The computer program product according to claim 3, wherein the supplement comprises a diff.

8. The computer program product according to claim 2, wherein said computer readable program code is configured to obtain a virtual appliance image template from the third location.

9. The computer program product according to claim 8, wherein said computer readable program code is configured to obtain the virtual appliance image template at a predetermined time.

10. The computer program product according to claim 8, wherein the third location comprises a virtual appliance development location.

11. The computer program product according to claim 2, wherein the second location comprises a cloud delivery location.

12. The computer program product according to claim 2, wherein:

said computer readable program code is further configured to store virtual appliance image patches at the caching location;

wherein to obtain a supplement comprises generating a virtual appliance image with a patch based on a historical request pattern.

13. The computer program product according to claim 12, wherein said generating comprises patching an available virtual appliance image template in the caching location with a diff available in the caching location.

* * * * *